Jan. 25, 1966  J. CHASS  3,230,777

JERKMETER

Filed Dec. 17, 1962

INVENTOR.
JACOB CHASS

BY

ATTORNEY

United States Patent Office 3,230,777
Patented Jan. 25, 1966

3,230,777
JERKMETER
Jacob Chass, Philadelphia, Pa., assignor, by mesne assignments, to Robinson-Halpern Company, West Conshohocken, Pa., a corporation of Pennsylvania
Filed Dec. 17, 1962, Ser. No. 245,298
5 Claims. (Cl. 73—517)

The present invention relates to a jerkmeter, and more particularly to a transducer for measuring the rate of change of acceleration.

In controlling the movement of many types of moving objects, it is often desirable to not only measure the speed and acceleration of the object, but also the rate of change of acceleration. Since a change in the acceleration of a moving object results in a sudden movement or jerk, devices for measuring such a change are referred to as "jerkmeter." To have a jerkmeter which has a long life and which is not subject to breakdown, it is desirable that the jerkmeter be free of any moving parts. Also, it is desirable that the jerkmeter be relatively small in size and inexpensive in cost.

It is an object of the present invention to provide a novel jerkmeter.

It is another object of the present invention to provide a novel transducer for measuring the rate of change of acceleration.

It is still another object of the present invention to provide a jerkmeter which will measure the rate of change of acceleration only along a single axis.

It is a further object of the present invention to provide a jerkmeter which has no moving parts.

It is a still further object of the present invention to provide a jerkmeter which is simple in construction and inexpensive to manufacture.

Other objects will appear hereinafter.

For the purpose of illustrating the invention there is shown in the drawings a form which is presently preferred; it being understood, however, that this invention is not limited to the precise arrangements and instrumentalities shown.

Figure 1:
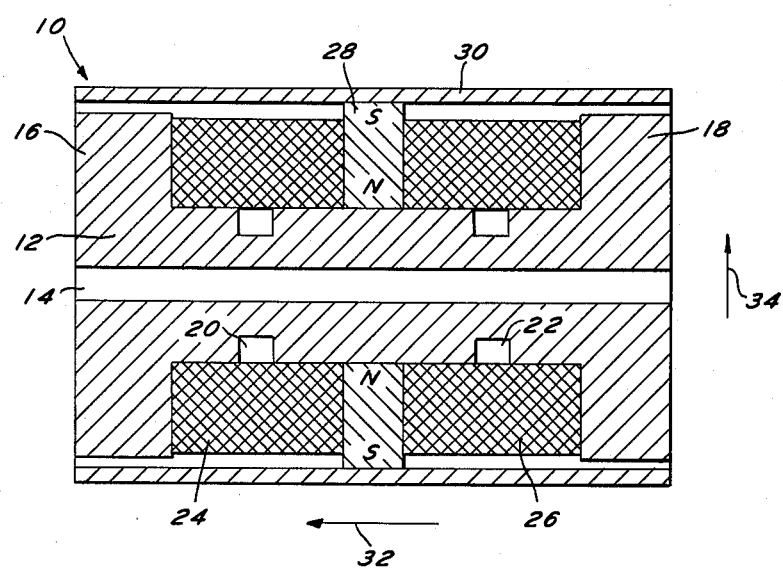
FIGURE 1 is a transverse sectional view of the jerkmeter of the present invention.
Figure 2:
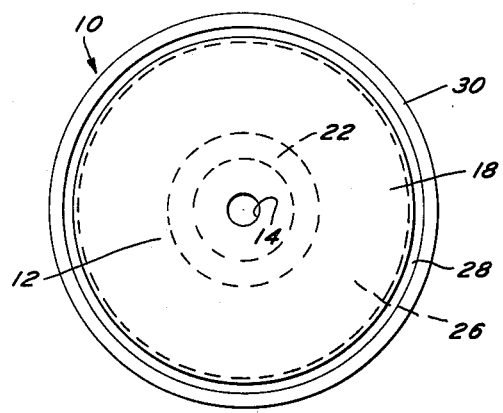
FIGURE 2 is an end view of the jerkmeter of the present invention.

Referring to the drawing, the jerkmeter of the present invention is generally designated as 10.

Jerkmeter 10 comprises a core 12 which is circular in transverse cross-section. The core 12 is made of a magnetic material the permeability of which will vary when the material is stressed, such as the permalloys. Core 12 is provided with a hole 14 extending therethrough along the longitudinal axis thereof. A pair of annular flanges 16 and 18 project radially outwardly from the core 12 at the ends thereof. The flanges 16 are 18 are sufficiently thick to provide enough mass to act as weights for reasons which will be explained later. The core 12 is provided with a pair of annular grooves 20 and 22 in its outer surface. The grooves 20 and 22 are uniformly spaced between the center of the length of the core 12 and the flanges 16 and 18.

A pair of coils 24 and 26 of insulated, electrically conductive wire are wound around the core 12 between the flanges 16 and 18, and in spaced relation to each other. The coil 24 extends across the annular groove 20 in the core 12, and the coil 26 extends across the annular groove 22. The coils 24 and 26 are of the same size and length, and are electrically connected in series.

Between the coils 24 and 26 is provided a source of a magnetic flux the time derivative of which equals zero. By this it is meant that the source provides a magnetic flux the magnitude of which does not vary with time. As shown, one such source of the magnetic flux is an annular permanent magnet 28. The magnet 28 surrounds the core 12 between the coils 24 and 26, and is secured to the core. Although the magnet 28 is shown as having its north pole at its inner periphery and its south pole at its outer periphery, the poles may be reversed.

A cylindrical mounting sleeve 30 of a magnetic material surrounds the core 12, coils 24 and 26, and the magnet 28. The sleeve 30 is secured to the outer periphery of the magnet 28, but the ends of the sleeve 30 are free from the flanges 16 and 18.

In the operation of the jerkmeter 10, the magnet 28 creates a pair of magnetic flux paths which extend in opposite directions from the magnet through the core 12, flanges 16 and 18, and sleeve 30. Thus, each of the coils 24 and 26 is encircled by a separate one of the magnetic flux paths so that a voltage is induced across each of the coils. Since the magnetic flux paths extend in opposite directions around the coils 24 and 26, the voltages induced across the coils are of opposite polarity. Since the coils 24 and 26 are electrically connected in series, when the magnitude of the voltages induced across the coils 24 and 26 are equal, the voltages will balance each other out to provide a zero voltage output from the jerkmeter 10.

In the use of the jerkmeter 10, a jerkmeter is mounted on a moving object by the mounting sleeve 30. When the object is accelerated in a direction longitudinally of the axis of the jerkmeter 10, for example in the direction of the arrow 32 in FIGURE 1, the flanges 16 and 18 will act as weights to apply forces to the portions of the core 12 under the coils 24 and 26 respectively, and thereby stress these portions of the core. Since the flange 16 is ahead of the core 12, the portion of the core 12 under the coil 24 will be stressed in compression. Since the flange 18 is behind the core 12, the portion of the core 12 under the coil 26 will be stressed in tension. As previously stated, the core 12 is of a material the permeability of which varies when the material is stressed. It is known that the permeability of such materials varies differently when stressed in tension than when stressed in compression. When such materials are stressed in tension, the permeability of the material decreases, and when stressed under compression, the permeability of the material increases.

Thus, when the jerkmeter 10 is accelerated in the direction of the arrow 32 in FIGURE 1, any force applied to the portion of the core under the coil 24 by the flange 16 will compress that portion of the core and thereby increase the permeability of that portion of the core. This causes the voltage induced across the coil 24 to increase. At the same time, any force applied to the portion of the core 12 under the coil 26 by the flange 18 will stress that portion of the core in tension so as to decrease the permeability of that portion of the core. This causes the voltage induced across the coil 26 to decrease. Thus, the voltages induced across the coils 24 and 26 will be different so as to provide an output signal from the jerkmeter 10.

The voltage induced across each of the coils 24 and 26 is a function of $dI/dt$ where I is the permeability of the core under the coil. Since the permeability of the core is only varied by means of a force applied to the core so as to stress the core, the voltage induced across each of the coils 24 and 26 is a function of $dF/dt$, where F is a force applied to the core upon accelerating the jerkmeter 10. Since the force equals mass times acceleration, and since the mass, the flanges 16 and 18, is constant, the voltage induced across each of the coils is a function of $da/dt$ where $a$ is acceleration. Thus, the voltage output from the jerkmeter 10 of the present invention is a function of the rate of change of acceleration of the jerkmeter. By pre-calibrating the jerkmeter 10 of the present invention, the output signal provided from the jerkmeter can be read directly as the rate of change of acceleration. Since the polarity of the signal from the jerkmeter 10 depends on which of the coils has an induced voltage of greater magnitude, the polarity of the output signal indicates the direction of movement of the jerkmeter.

If the jerkmeter 10 of the present invention is accelerated radially, for example in the direction of the arrow 34 in FIGURE 1, there will be no change in the output of the jerkmeter 10. When the jerkmeter 10 is accelerated radially, both of the flanges 16 and 18 are accelerated radially in the same direction so as to stress the portions of the core 12 under the coils 24 and 26 in the same manner. Thus, the permeability of the portions of the core 12 under both of the coils 24 and 26 are varied in the same manner so that the voltages induced across both of the coils are varied in the same manner. Since the voltages induced across the coils 24 and 26 are of opposite polarity, the variation in the voltages induced across the coils will balance each other so that the output from the jerkmeter 10 remains constant. Thus, the voltage output from the jerkmeter 10 of the present invention is varied only when the jerkmeter is accelerated longitudinally, but is unaffected by radial acceleration. Therefore, the jerkmeter 10 of the present invention can be used to accurately measure the rate of change of acceleration in any one direction by mounting the jerkmeter 10 so that it is accelerated longitudinally in the desired direction.

Although the flanges 16 and 18, which act as the weights for stressing the core 12 are shown as being integral with the core 12, the flanges 16 and 18 may be separate elements secured to the core 12. The flanges 16 and 18 should be of the same mass, and should be of sufficient mass to provide the desired stressing of the core 12. The flanges 16 and 18 should be of the same mass, and should be of sufficient mass to provide the desired stressing of the core 12. The annular grooves 20 and 22 in the outer surface of the core 12 improve the linearity of the variation of the voltage induced across the coils 24 and 26 with respect to the variation in the force applied to the core 12. The annular grooves 20 and 22 reduce the cross-sectional thickness of a portion of the core 12 so that when a force is applied to the core, the stresses are first concentrated in the portions of reduced-sectional thickness. It has been found that this concentration of the stresses substantially improves the linearity of the variation in the voltage induced across the coils with respect to the change in force applied to the core.

Thus, the jerkmeter 10 of the present invention is a small, compact unit which is easy to assemble so as to be inexpensive to manufacture. Also, the jerkmeter 10 of the present invention has no moving parts so that it is not subject to inaccuracies due to wear or breakdown during use. Furthermore, the jerkmeter of the present invention provides for accurate measurement of rate of change of acceleration in any one direction, and is unaffected by being accelerated in directions other than the direction being measured.

The present invention may be embodied in other specific forms without departing from the spirit or essential attributes thereof and, accordingly, reference should be made to the appended claims, rather than to the foregoing specification as indicating the scope of the invention.

I claim:

1. A jerkmeter comprising a core of a material the permeability of which varies when the material is stressed, a pair of weights of the same mass secured to said core in spaced relation, a pair of coils of an insulated electrically conductive wire wound around said core in side-by-side but spaced relation, said coils being electrically connected in series and being positioned between said weights, and means on said core between said coils providing a magnetic flux the time derivative of which is zero which flux passes through the coils in opposite directions.

2. A jerkmeter in accordance with claim 1 in which the core is cylindrical, and the weights are secured to the ends of the core.

3. A jerkmeter in accordance with claim 2 in which the core is provided with a pair of annular grooves in its outer surface, each of said grooves being within a separate one of the coils.

4. A jerkmeter in accordance with claim 1 in which the means providing the mangetic flux comprises a permanent magnet surrounding said core between the coils.

5. A jerkmeter in accordance with claim 4 in which the magnet is secured to the core, and a mounting sleeve of magnetic material surrounds the core, magnet and coils, said sleeve being secured only to said magnet.

References Cited by the Examiner

UNITED STATES PATENTS

| | | | |
|---|---|---|---|
| 2,338,732 | 1/1944 | Nosker | 73—517 |
| 2,445,318 | 7/1948 | Eldredge | 310—26 |
| 2,619,605 | 11/1952 | Lancor | 310—26 |
| 2,650,991 | 9/1953 | Ketchledge | 73—516 |
| 2,842,689 | 7/1958 | Harris | 310—26 |

FOREIGN PATENTS 681,824   10/1952   Great Britain.

RICHARD C. QUEISSER, *Primary Examiner.*

JOSEPH P. STRIZAK, *Examiner.*